(12) United States Patent
Sasaki

(10) Patent No.: US 6,233,001 B1
(45) Date of Patent: May 15, 2001

(54) IMAGE RECORDING APPARATUS

(75) Inventor: Yoshiharu Sasaki, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/324,911

(22) Filed: Jun. 3, 1999

(30) Foreign Application Priority Data

Jun. 4, 1998 (JP) ................................. 10-156187

(51) Int. Cl.$^7$ ............................. B41J 15/14; G02B 6/02
(52) U.S. Cl. ................. 347/256; 347/241; 385/124; 385/123
(58) Field of Search ............................ 347/256, 241; 385/73, 116, 121, 123, 124; 372/6; 358/484; 359/151, 341; 362/511

(56) References Cited

U.S. PATENT DOCUMENTS 5,566,267 * 10/1996 Neuberger ............................ 385/123
5,887,009 * 3/1999 Mandella et al. ....................... 372/6
6,010,787 * 1/2000 Yamaguchi et al. ................. 385/123

* cited by examiner

*Primary Examiner*—N. Le
*Assistant Examiner*—Hai C. Pham
(74) *Attorney, Agent, or Firm*—Sughrue, Mion, Zinn, Macpeak & Seas, PLLC

(57) ABSTRACT

An image recording apparatus for recording an image on an image recording medium, comprises a laser head for exposing the recording medium to laser light to record the image thereon, a laser light source for emitting the laser light, and an optical fiber connected between the laser light source and the laser head for guiding the laser light emitted from the laser light source to the laser head, the optical fiber having a core portion formed into a substantially rectangular shape in section, wherein a refractive index of the core portion along a first sectional axis is substantially constant and a refractive index along a second sectional axis perpendicular to the first sectional axis is gradually changed.

7 Claims, 7 Drawing Sheets

REFRACTIVE INDEX

REFRACTIVE INDEX

REFRACTIVE INDEX

REFRACTIVE INDEX

IMAGE RECORDING APPARATUS

BACKGROUND OF THE INVENTION

The present invention relates to an image recording apparatus, and particularly to an image recording apparatus in which an optical fiber is used in a recording laser head to thereby improve the utility efficiency of energy when images, characters, etc. are recorded on a recording medium.

FIGS. 6(a) and 6(b) show a fundamental structure of an optical fiber. An optical fiber usually has a layer 2 called a clad portion and formed around a core portion (light transmitting portion) 1 which is circular in section. Optical fibers are roughly classified into two types, that is, a step-index type and a graded-index type. The step-index type optical fiber is designed so that the refractive index is stepwise changed in the interface between the core portion and the clad portion of the optical fiber. The refractive index of the core portion is made constant to be n1, while the refractive index of the clad portion is made constant to be n2 (n1>n2). On the other hand, the graded-index type optical fiber is designed so that the refractive index of the core portion is changed gradually from the center portion toward the outer circumference. Specifically, the refractive index of the core portion takes a maximum at the center portion, which it decreases as the portion goes toward the interface with the clad portion.

FIG. 7(a) shows the refractive index of the core portion and that of the clad portion in the step-index type optical fiber, and FIG. 8(a) shows the refractive index of the core portion and that of the clad portion in the graded-index type optical fiber. In addition, FIG. 7(b) and FIG. 8(b) show intensity profiles of light emitted from the step-index type optical fiber and the graded-index type optical fiber, respectively, when the optical fiber is connected to a laser light source through a lens or the like. In the FIGS. 7(b) and 8(b), dashed lines indicate the refractive index of the respective core portions.

FIGS. 9(a) and 9(b) three-dimensionally show the intensity profiles of light emitted from the step-index type and graded-index type optical fibers respectively. That is, FIG. 9(a) shows a top-hat shaped profile of laser light emitted from the step-index type optical fiber. FIG. 9(b) shows a substantially Gaussian profile of laser light emitted from the graded-index type optical fiber.

In each of the laser light emission profiles of the top-hat shape and the substantially Gaussian shape shown in FIGS. 9(a) and 9(b), there is a problem that the energy of laser light cannot be utilized effectively. That is, though the energy could be utilized most effectively in a laser printer if the dot shape could be made square as much as possible, there is a problem that though recording can be attained only in the vicinity of the central portion of the light emission profile, it cannot be performed in the circumferential portion, because the dot shape is not completely square, as shown in FIG. 7(b), FIG. 8(b), and FIGS. 9(a) and 9(b) showing the dot shape in three dimensions, and the insufficiency of light intensity.

SUMMARY OF THE INVENTION

It is therefore an object of the present invention to solve the above problem in the related art by providing an image recording apparatus in which a laser light source and an optical fiber are used for a recording laser head so that the availability of energy can be improved when images, characters, etc. are recorded in a recording medium.

In order to achieve the above object, there is provided an image recording apparatus for recording an image on an image recording medium, comprising: a laser head for exposing the recording medium to laser light to record the image thereon; a laser light source for emitting the laser light; and an optical fiber connected between the laser light source and the laser head for guiding the laser light emitted from the laser light source to the laser head, the optical fiber having a core portion formed into a substantially rectangular shape in section, wherein a refractive index of the core portion along a first sectional axis is substantially constant and a refractive index along a second sectional axis perpendicular to the first sectional axis is gradually changed.

In the apparatus, an intensity profile of the emitted laser light from the laser light source along a first sectional axis is constant, an intensity profile along a second sectional axis perpendicular to the first sectional axis is substantially Gaussian shape, and the first and second sectional axes of the emitted laser light are made substantially coincident with the first and second sectional axes of the core portion, respectively.

In the apparatus, the second sectional axes of the emitted laser light and the core portion is substantially parallel with a main scanning direction of the recording medium.

DETAILED DESCRIPTION OF THE PREFERRED EMBODIMENTS

One preferred embodiment of the present invention will be described below in detail with reference to the accompanying drawings.

Figure 1:
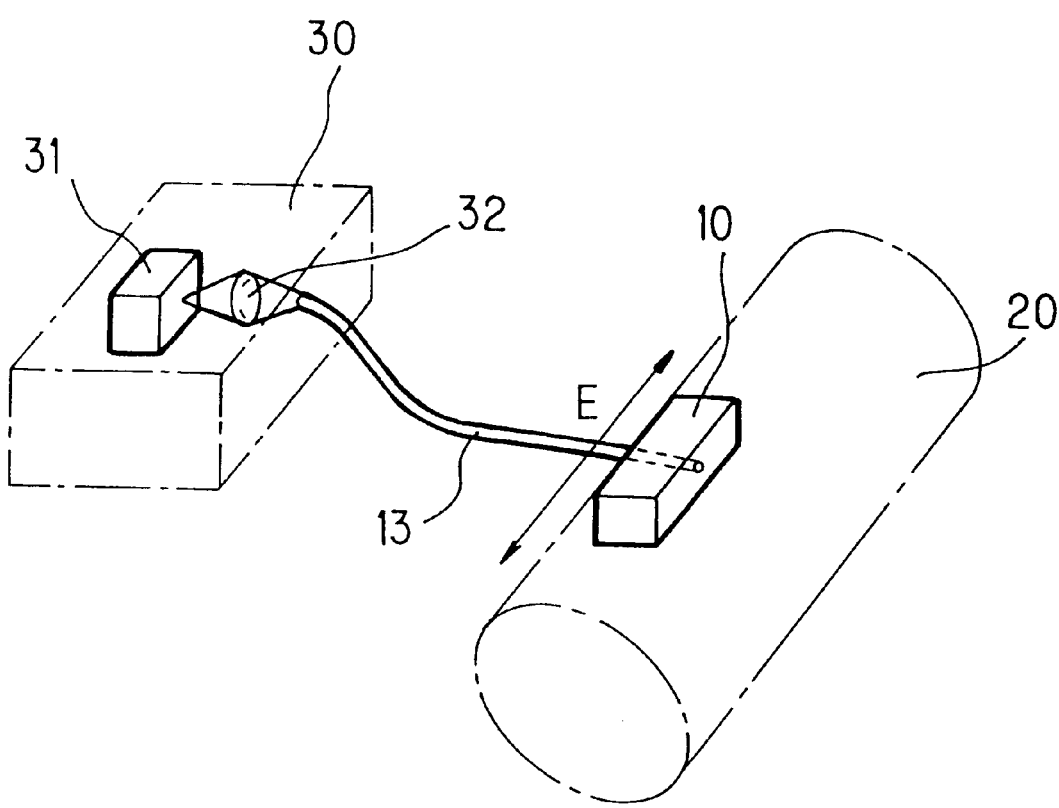
FIG. 1 is a schematic illustration showing a configuration of an exposing device which is an essential part of a laser beam printer according to one embodiment of the present invention.

FIG. 1 is a schematic diagram showing a configuration of an essential part of a laser beam printer according to one embodiment of the present invention. In FIG. 1, the reference numeral 10 represents an exposing device; and 20, a recording drum which will be described later. The exposing device 10 is connected with a controller 30 through an optical fiber 13, as will be described later. In addition, there is provided a member for performing the sub-scanning by moving the exposing device 10 in the axial direction, though it is not shown.

A light source and the optical fiber used here are not limited to one, but a plurality of light sources and optical fibers are generally used in the form of a linear array or a two-dimensional array.

The controller 30 includes a modulator and has a function to receive image data transmitted as digital signals from an external image reader or the like and transmit the image data to the exposing device 10 after giving necessary processing to the image data. In addition, the controller 30 has a laser light source 31 for emitting laser light of high density energy; an imaging lens 32 for adjusting the beam spot diameter of the laser light; an optical fiber 13 for guiding the laser light to an exposing position where exposure is performed by the exposing device 10; and so on. The light emission end of the optical fiber 13 is disposed on the surface of the exposing device 10 facing the recording drum 20.

In the laser beam printer according to this embodiment, after an image forming operation which will be described later is repeated gradually for three or four colors so as to form a color image on an image receiving sheet, and this image on the image receiving sheet is brought into close contact with paper (permanent substrate) fed from a not-shown paper feeding portion so that the image is transferred to the paper.

The image formation process after the exposure by the laser beam is the same as disclosed in detail, for example, in Unexamined Japanese Patent Publication No. 7-290731 and so on. The image forming process is therefore described schematically herein, while its detail is omitted.

Though not shown in the drawing, the image receiving sheet and a toner sheet are stacked on the outer circumferential surface of the recording drum 20 in this order from a lower side, under pressing and heating. Then, heat mode exposure is performed in accordance with the shape of an image by laser light from the exposing device 10 which is modulated by the controller 30 in accordance with image signals, so that the image is recorded as a latent image on the toner sheet. After the exposure, the toner sheet is separated from the image receiving sheet by a not-shown separating member, and the image recorded as a latent image on the toner sheet is transferred to the image receiving sheet and developed so as to form an image on the image receiving sheet.

In the controller 30, the laser light emitted from the laser light source 31 is subjected to on-off modulation in accordance with dot information from the image reader or the like by the modulator, while the recording drum 20 is scanned by the above-mentioned sub-scanning member, so that horizontal scanning is repeated, at a fixed speed, with light in the form of a very small spot from the light emission end of the optical fiber 13. In addition, since the recording drum 20 rotates at a fixed speed, a latent image of a printing pattern can be formed by a set of scanning lines on the recording drum 20.

Figure 2:
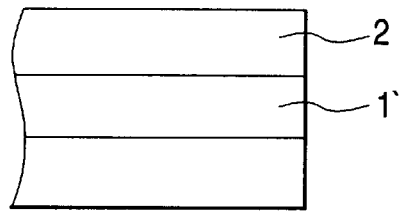
FIG. 2(a) is a section view of an end portion of an optical fiber used in the exposing device shown in FIG. 1 along a longitudinal direction thereof.
FIG. 2(b) is a section view of an end portion of an optical fiber used in the exposing device shown in FIG. 1 along a radial direction thereof.
Figure 2:
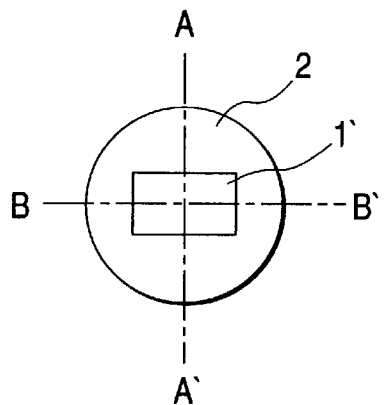

FIGS. 2(a) and 2(b) show an end surface of the above-mentioned optical fiber 13 constituting a light guide path. As shown in FIG. 2, a core portion 1' of the optical fiber 13 used in the laser beam printer according to this embodiment is made rectangular in section.

A CVD method, a VAD method, a double-crucible method, etc. are available for the method of manufacturing such an optical fiber having a core portion rectangular in section.

Figure 3:
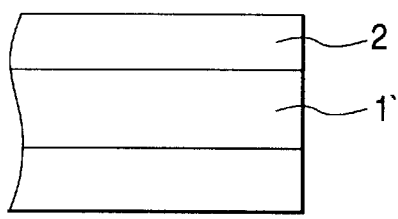
FIG. 3(a) is a longitudinal section view of the optical fiber shown in FIG. 2 taken along the ling A—A'.
FIG. 3(b) is an refractive index profile of the optical fiber shown in FIG. 3(a)
FIG. 3(c) is a longitudinal section view of the optical fiber shown in FIG. 2 taken along the ling B—B'.
FIG. 3(d) is an refractive index profile of the optical fiber shown in FIG. 3(c)
Figure 3:
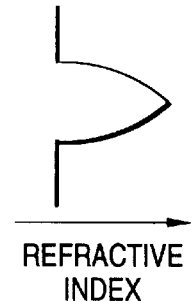
Figure 3:
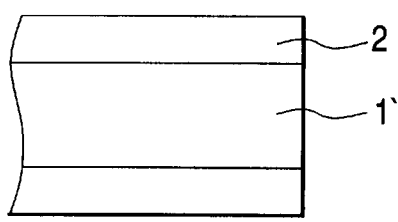
Figure 3:
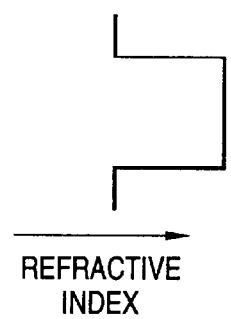

FIGS. 3(a) to 3(d) show refractive index profiles of the optical fiber taken along the lines A—A' and B—B' shown in FIG. 2(b). As shown in FIGS. 3(a) and 3(b), the core portion 1' of the optical fiber used in the laser beam printer according to this embodiment is designed so that the refractive index gradually changes from the center toward the outer circumference in the A—A' section in the same manner as that in a graded-index type optical fiber. More specifically, the refractive index takes a maximum in the center portion of the core portion 1', and the refractive index decreases as the position goes toward the interface with a clad portion 2.

On the other hand, as shown in FIGS. 3(c) and 3(d), the core portion 1' of the optical fiber used in the laser beam printer according to this embodiment is designed so that the refractive index is made constant in the B—B' section in the same manner as that in a step-index type optical fiber.

Figure 4:
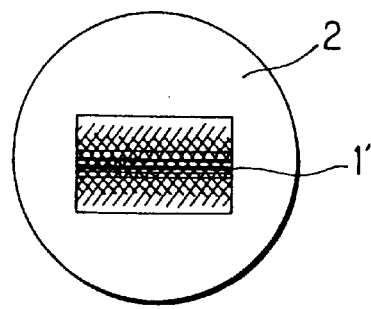
FIG. 4 is a schematic diagram showing the refractive index profile in the core portion 1' of the optical fiber shown in FIG. 2.

Therefore, the core portion 1' of the optical fiber used in the laser beam printer according to this embodiment has refractive index profile as shown in FIG. 4, where high refractive index portion is shown by hatching with high density. That is, the optical fiber 13 has a substantially-Gaussian-shaped refractive index profile in the section along the A—A' line and substantially constant refractive index profile in the section along the B—B' line perpendicular to the A—A' section.

Figure 5:
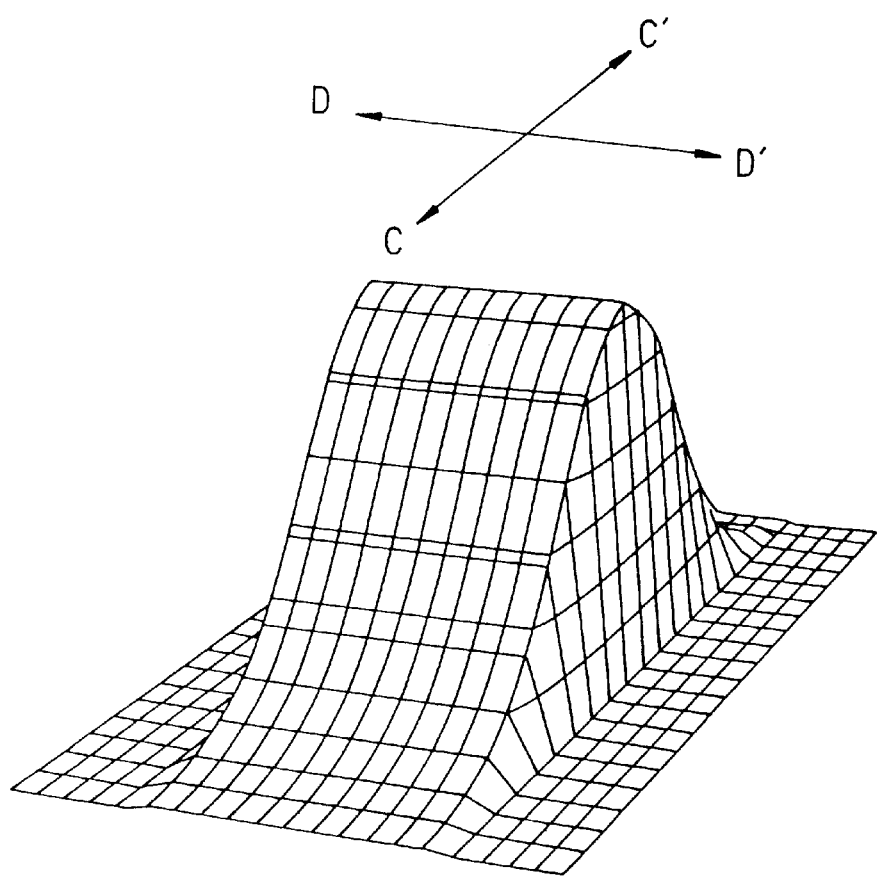
FIG. 5 is a diagram showing an intensity profile of light emitted from the laser light source shown in FIG. 1.
Figure 6:
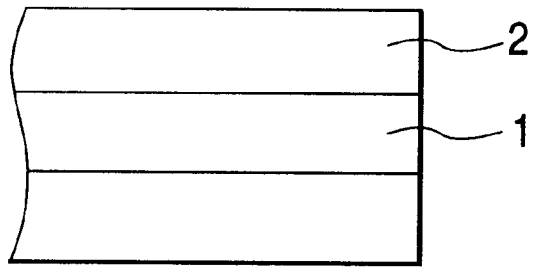
FIG. 6(a) is a section view of an end portion of a related optical fiber along a longitudinal direction thereof.
FIG. 6(b) is a section view of an end portion of a related optical fiber along a radial direction thereof.
Figure 6:
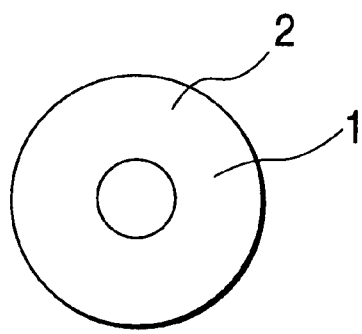
Figure 7:
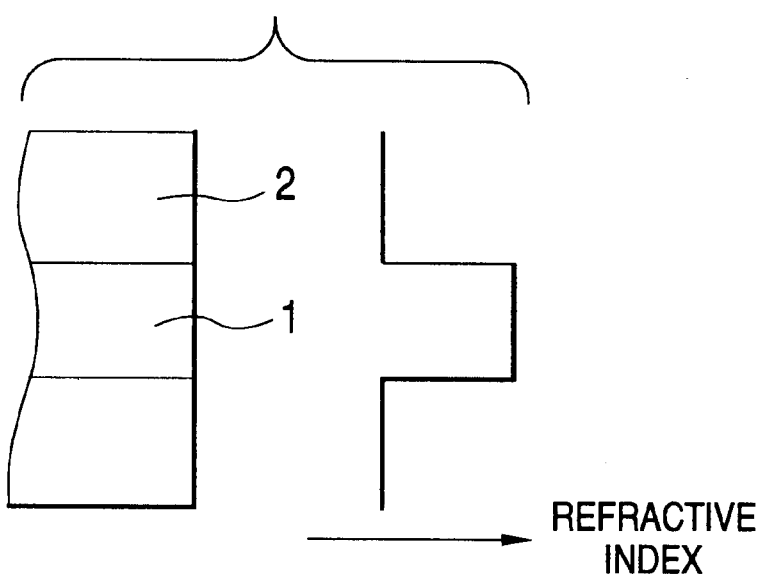
FIG. 7(a) is a schematic diagram showing the refractive index profile in a step-index type optical fiber.
FIG. 7(b) is an intensity profile of light emitted from the optical fiber shown in FIG. 7(a)
Figure 7:
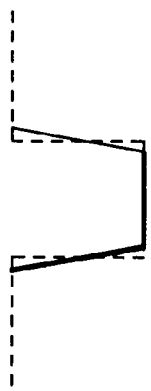
Figure 8:
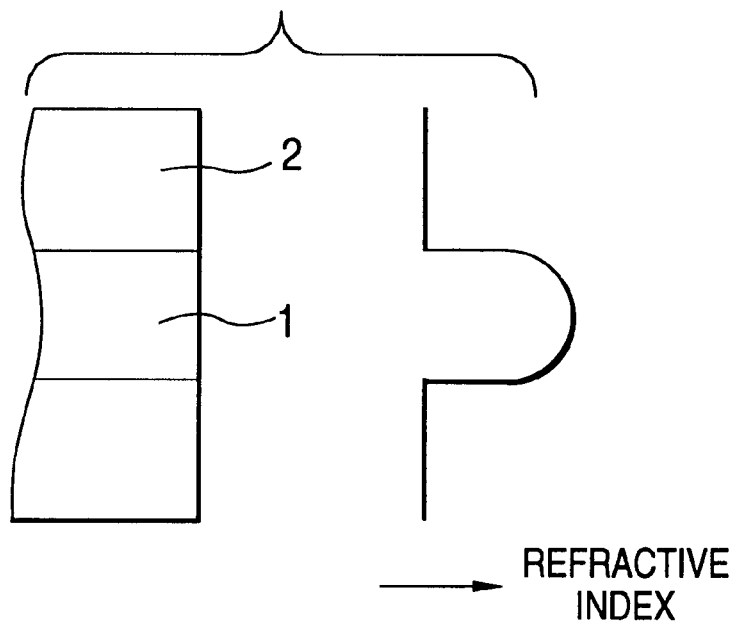
FIG. 8(a) is a schematic diagram showing the refractive index profile in a graded-index type optical fiber.
FIG. 8(b) is an intensity profile of light emitted from the optical fiber shown in FIG. 8(a)
Figure 8:
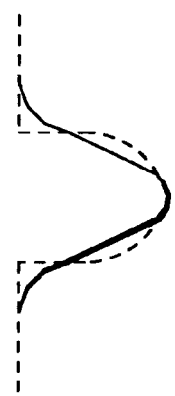
Figure 9:
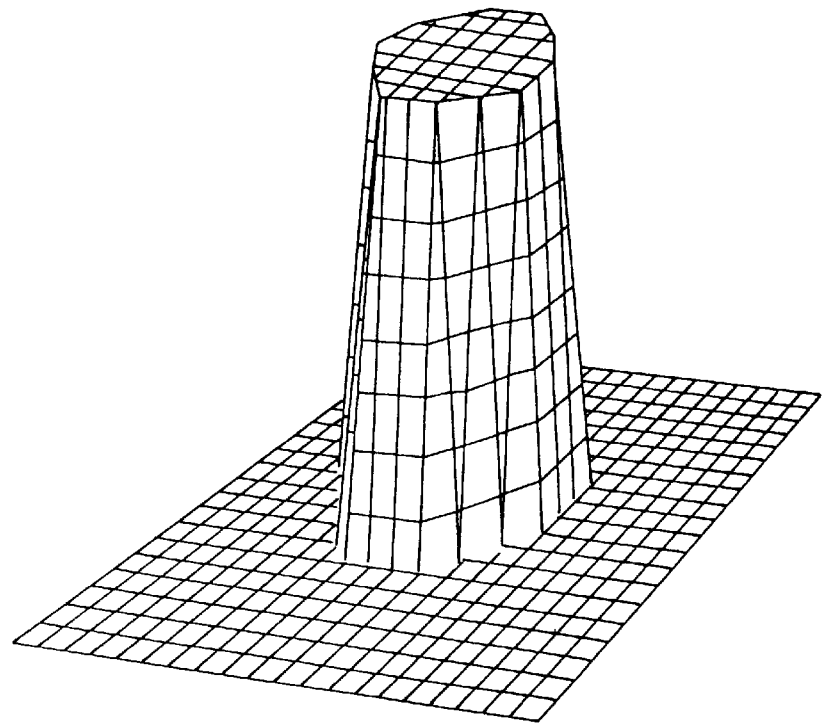
FIG. 9(a) is a 3-D representation of the intensity profile of light emitted from the optical fiber shown in FIG. 7(a)
FIG. 9(b) is a 3-D representation of the intensity profile of light emitted from the optical fiber shown in FIG. 7(b)
Figure 9:
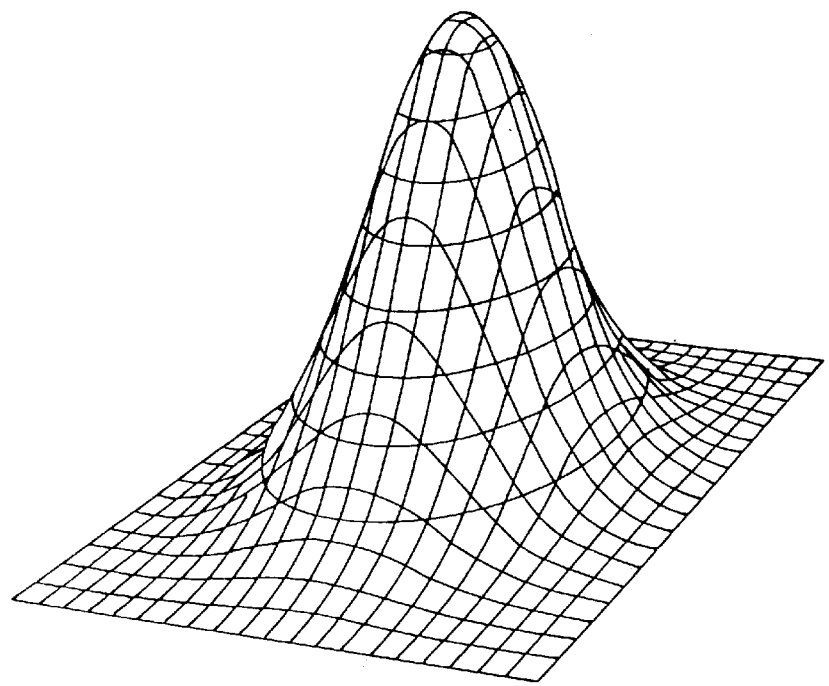

FIG. 5 shows an intensity profile of laser light emitted from the laser light source 31 used in the laser beam printer according to this embodiment. This light intensity profile shows substantially-Gaussian-shaped profile in the section along the C—C' line, and substantially constant profile in the section along the D—D' line perpendicular to the C—C' section.

In the above-mentioned laser beam printer according to this embodiment, the C—C' section axis (see FIG. 5) of the intensity profile of the emission laser light is made coincident with the A—A' section axis of the optical fiber shown in FIG. 2(b). In this configuration, the intensity profile of laser light emitted from the laser light source is also in a shape as well shown in FIG. 5. However, the horizontal-vertical ratio of the profile may be changed in accordance with the refractive index profile of the optical fiber. In such a manner, the shape of the light intensity profile of the laser light can be preservatively transmitted onto the recording drum 20, that is, with a small loss. As a result, in the laser beam printer according to this embodiment, it is possible to effectively utilize the emission energy of the laser light so as to bring a good effect on the improvement of image quality.

In the above-mentioned laser beam printer according to this embodiment, the D—D' section axis of the intensity profile of the emission laser light is made coincident with the above-mentioned subscanning direction in consideration with the following reason.

The recording sensitivity of the recording medium is not always constant and there is deviation from the predetermined value, which is inherent to the manufacturing process. On the other hand, the accumulated intensity of the light emitted from the optical fiber varies as well. The deviation is derived from inherent differences among the emitted light intensity profile of the respective laser light sources.

Figure 10:
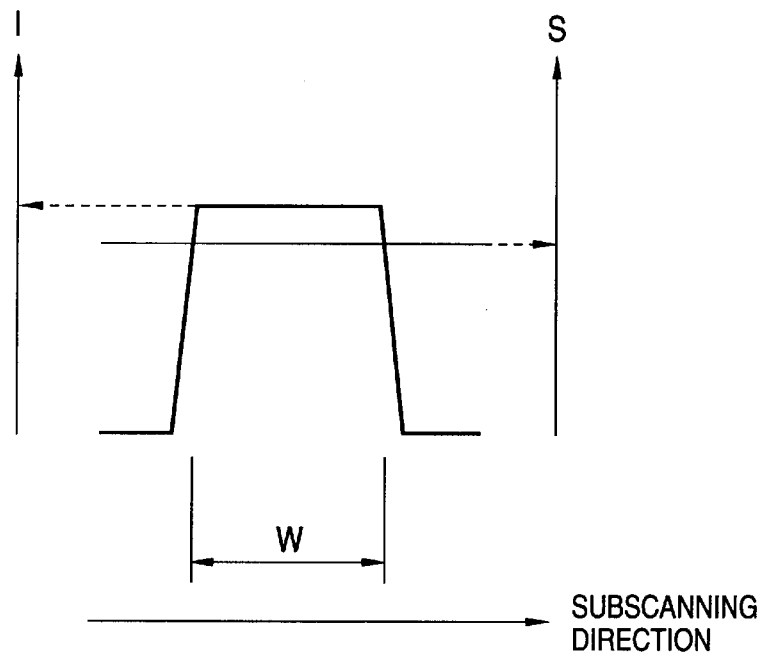
FIGS. 10(a) and 10(b) are schematic diagrams showing relationship among the accumulated intensity, the recording sensitivity of the recording medium and the width of recorded line on the recording medium.
Figure 10:
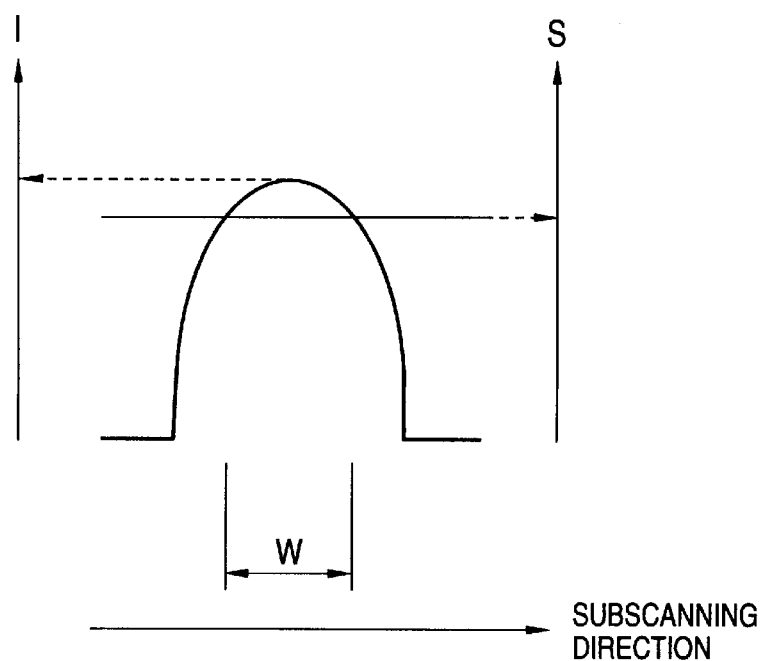

FIG. 10(a) is a schematic diagram showing relationship among the accumulated intensity I, the recording sensitivity S of the recording medium and the width W of recorded line on the recording medium in a case where the D—D' section axis of the intensity profile of the emission laser light is made coincident with the subscanning direction. FIG. 10(b) is a schematic diagram showing the same in a case where the C—C' section axis of the intensity profile of the emission laser light is made coincident with the subscanning direction.

As clearly shown in the figures, the accumulated light intensity profile is in a substantially rectangular shape when the D—D' section axis is made coincident with the subscanning direction, while it is in a substantially dome-like shape when the C—C' section axis is made coincident with the subscanning direction. Comparing both profiles with each other, it is clear that the former case is difficult to be influenced by the above-mentioned deviations.

Therefore, the laser beam printer in this embodiment is capable of improving the quality of the recorded image.

The above-mentioned embodiment represents one example of the present invention, and needless to say, the present invention should not be limited to this embodiment.

In the above-mentioned embodiment, the exposing device 10 is designed to support only the light emission end of the optical fiber 13, in order to reduce the load of the subscanning member. However, the controller 30 and the exposing device 10 may be connected through a plurality of optical fibers so that the sub-scanning can be performed on the controller 30 side.

As has been described above in detail, according to the present invention, there exerts a conspicuous effect that it is possible to realize an image recording apparatus in which a laser light source and an optical fiber are used in a recording laser head so that energy availability in recording images, characters, etc. on a recording medium can be improved.

What is claimed is:

1. An image recording apparatus for recording an image on an image recording medium, comprising:

a laser head for exposing the recording medium to laser light to record the image thereon;

a laser light source for emitting the laser light; and an optical fiber connected between the laser light source and the laser head for guiding the laser light emitted from the laser light source to the laser head, the optical fiber having a core portion formed into a substantially rectangular shape in section, wherein a refractive index of the core portion along a first sectional axis is substantially constant and a refractive index along a second sectional axis perpendicular to the first sectional axis is gradually changed.

2. The image recording apparatus as set forth in claim 1, wherein an intensity profile of the emitted laser light from the laser light source along a first sectional axis is constant, an intensity profile along a second sectional axis perpendicular to the first sectional axis is substantially Gaussian shape, and the first and second sectional axes of the emitted laser light are made substantially coincident with the first and second sectional axes of the core portion, respectively.

3. The image recording apparatus as set forth in claim 1, wherein the second sectional axes of the emitted laser light and the core portion are substantially parallel with a main scanning direction of the recording medium.

4. A laser head unit incorporated in an image recording apparatus for recording an image on an image recording apparatus, comprising:

a head portion for exposing the recording medium to laser light to record the image thereon;

a light source portion for emitting the laser light; and an optical fiber connected between the light source portion and the head portion for guiding the laser light emitted from the light source portion to the head portion, the optical fiber having a core portion formed into a substantially rectangular shape in section, wherein a refractive index of the core portion along a first sectional axis is substantially constant and a refractive index along a second sectional axis perpendicular to the first sectional axis is gradually changed.

5. The laser head unit as set forth in claim 4, wherein an intensity profile of the emitted laser light from the light source portion along a first sectional axis is constant, an intensity profile along a second sectional axis perpendicular to the first sectional axis is substantially Gaussian shape, and the first and second sectional axes of the emitted laser light are made substantially coincident with the first and second sectional axes of the core portion, respectively.

6. The laser head unit as set forth in claim 5, wherein the second sectional axes of the emitted laser light and the core portion are substantially parallel with a main scanning direction of the recording medium.

7. An optical fiber connected to a laser light source of the recording laser head incorporated in an image recording apparatus, comprising:

a core portion formed into a substantially rectangular shape in section; and a clad portion covering the core portion, wherein a refractive index of the core portion along a first sectional axis is substantially constant and a refractive index along a second sectional axis perpendicular to the first sectional axis is gradually changed.

* * * * *